Figure 1:
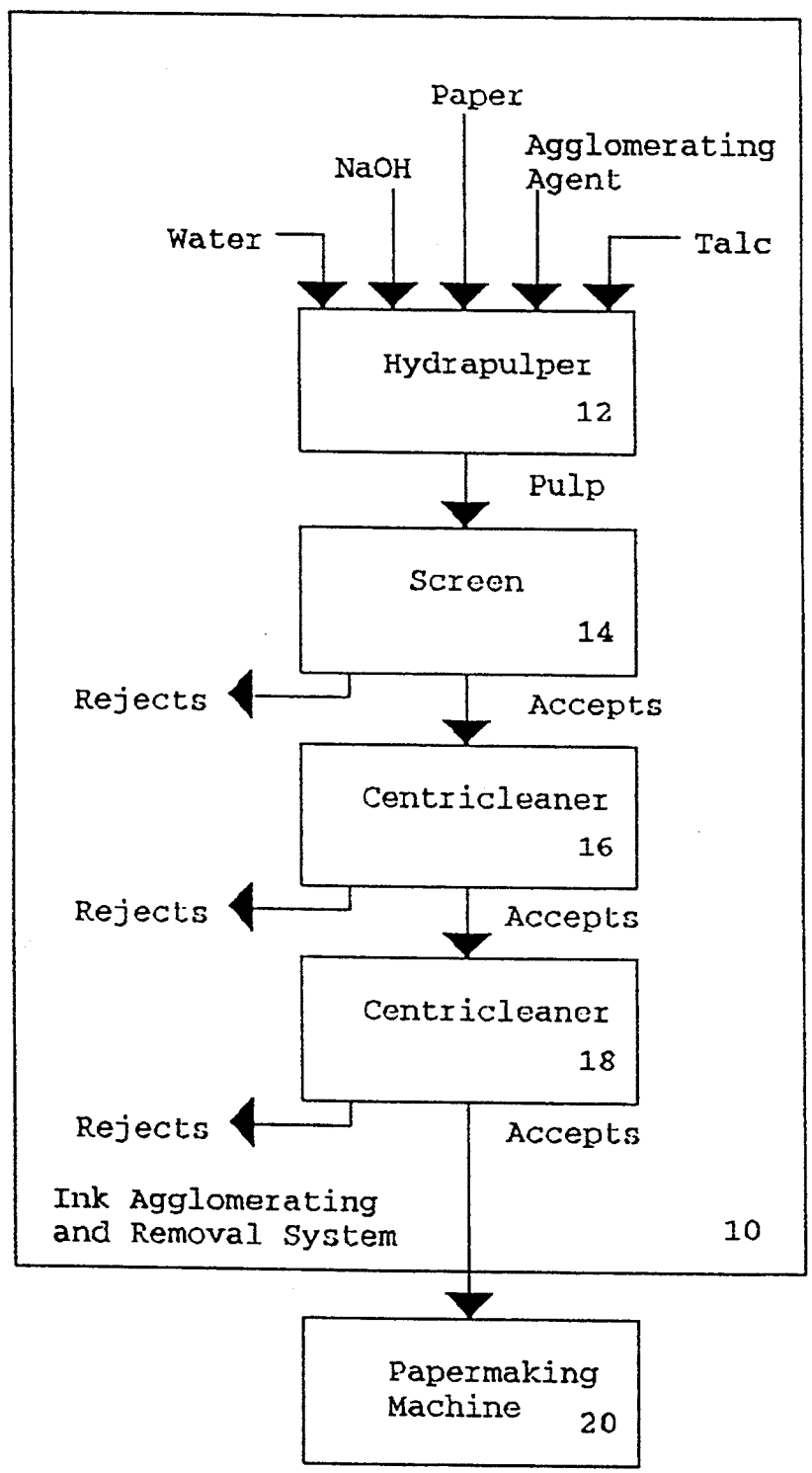

United States Patent [19]

Markham et al.

[11] Patent Number: 5,340,439

[45] Date of Patent: Aug. 23, 1994

[54] METHOD FOR REMOVING INK FROM PRINTED PAPER USING AGGLOMERATING AGENT, FOLLOWED BY ADDITION OF TALC

[75] Inventors: Larry D. Markham, Mobile, Ala.; Narendta R. Srivatsa, Tuxedo, N.Y.

[73] Assignee: International Paper Company, Purchase, N.Y.

[21] Appl. No.: 926,841

[22] Filed: Aug. 6, 1992

[51] Int. Cl.$^5$ ................................. D21C 5/02
[52] U.S. Cl. ........................... 162/5; 162/55
[58] Field of Search .................. 162/4, 5, 55

[56] References Cited

U.S. PATENT DOCUMENTS

| | | | |
|---|---|---|---|
| 1,585,092 | 5/1926 | Granton | 162/5 |
| 2,916,412 | 12/1959 | Altmann et al. | 162/4 |
| 2,959,513 | 11/1960 | Savage | 162/6 |
| 2,977,274 | 3/1961 | Hollis | 162/4 |
| 3,220,546 | 11/1965 | Gardner | 209/7 |
| 3,957,572 | 5/1976 | Eriksson | 162/4 |
| 4,013,505 | 3/1977 | Balcar et al. | 162/5 |
| 4,076,578 | 2/1978 | Puddington et al. | 162/5 |
| 4,188,259 | 2/1980 | Mamers et al. | 162/4 |
| 4,231,526 | 11/1980 | Ortner et al. | 241/28 |
| 4,326,922 | 4/1982 | Mollett | 162/5 |
| 4,360,402 | 11/1982 | Ortner et al. | 162/5 |
| 4,518,459 | 5/1985 | Freis | 162/5 |
| 4,561,933 | 12/1985 | Wood et al. | 162/5 |
| 4,643,800 | 2/1987 | Maloney et al. | 162/5 |
| 4,780,179 | 10/1988 | Clement | 162/5 |
| 4,820,379 | 4/1989 | Darlington | 162/5 |
| 4,872,953 | 10/1989 | Smith | 162/261 |
| 4,883,603 | 11/1989 | Roggenatein et al. | 210/802 |
| 4,915,821 | 4/1990 | Lamort | 162/55 |
| 4,919,754 | 4/1990 | Mollett et al. | 162/5 |
| 4,935,096 | 6/1990 | Gallagher et al. | 162/5 |

FOREIGN PATENT DOCUMENTS 2832827  2/1979  Fed. Rep. of Germany .

OTHER PUBLICATIONS

T. H. Quick and K. T. Hodgson "Xerography Deinking—A Fundamental Approach" Tappi, Mar. 1986.
B. D. Sparks and I. E. Puddington "Deinking of Waste News by Absorption of Contaminats on a Hydrophobic, Particulate Solid" Tappi, Nov. 1976.
W. B. Darlington "A New Process for Deinking Electrostatically-Printed Secondary Fiber" Tappi, Jan. 1989.
"Pulper Deinking of Laser Print" 1991 Beltz Paperchem, Inc.
Sidney D. Wells The De-Inking of Old Newspapers.
U.S. Dept. of Agriculture Forest Service—Forest Products Laboratory in cooperation with the University of Wisconsin, Madison, Wis., Jun., 1922.

*Primary Examiner*—Karen M. Hastings
*Attorney, Agent, or Firm*—Luedeka, Neely & Graham

[57] ABSTRACT

A method for removing ink from printed paper to be recycled by pulping the printed paper to be recycled with water to produce a paper pulp slurry with a consistency of between about 1% and about 20%, adjusting the pH of the paper pulp slurry to between about 6 and about 13, maintaining the paper pulp slurry at a temperature of between about 30° C. and about 100° C., adding an agglomerating agent to the paper pulp slurry, pulping the paper pulp slurry for a period of between about 5 min. and about 90 min., such that the ink particles agglomerate, thereafter, adding between about 0.2 wt. % and about 2.0 wt. %, based on the dry weight of the pulp, of talc to the paper pulp slurry, and thereafter, removing the agglomerated ink particles from the paper pulp slurry.

10 Claims, 2 Drawing Sheets

METHOD FOR REMOVING INK FROM PRINTED PAPER USING AGGLOMERATING AGENT, FOLLOWED BY ADDITION OF TALC

The present invention relates to methods for the removal of toner, ink or the like from paper. More specifically, the invention relates to methods for the removal of laser and impact printer and xerographic toner, ink or the like from waste paper.

As used herein "ink" means any of the inks, toners or the like as referenced above.

The amount of paper printed with electrostatic toners continues to increase as low cost laser printers and xerographic copiers become more common in businesses and at home. As a result, these papers are becoming a more important secondary fiber source to recycling mills.

In general, the conventional ink removal processes of alkaline washing and flotation are inadequate to the task of removing the electrostatic toner ink from the fibers. The toner particles removed from the repulped fibers during the conventional process are usually flat flakes and small ink particles which will easily slip through the slots in commonly used removal screens. Thus, the recycled papers prepared from waste papers printed with laser printers or xerographic copiers usually have higher dirt counts and are less bright than similar grades of recycled paper prepared from waste paper printed using other techniques. In most cases, as the dirt count of the recycled papers goes up the value of the paper goes down.

Since offices can use a variety of printers, the papers received at the recycling mill often contain a variety of papers printed with a variety of inks. The inks from those papers printed with inks of the class described will contaminate the recycled fibers of the papers which were printed with other types of inks. When papers printed with electrostatic toners are mixed, for example, with papers printed by other methods, paper prepared from the waste pulp will have dirt counts near those of papers prepared from waste papers printed with inks of the class described. Therefore, papers printed with electrostatic toners are not only difficult to recycle but they may make other papers difficult to recycle as well.

Present technology to remove ink from waste paper uses either of two opposing approaches. One approach is to disperse the ink particles into the pulp solution and remove them by filtering off the fibers while allowing the solution to pass through the filters.

An alternative approach is to agglomerate the ink into particles large enough to be removed from the pulp. In general, the pulp slurry is passed through a screen with slots large enough to pass the fibers but small enough to trap the ink particles. A problem with the agglomeration method is that the agglomerated ink particles are not of uniform size and, often, will be sufficiently small to pass through the screen. These particles eventually end up contaminating the paper formed from the recycled pulp.

Accordingly, it is an object of the present invention to provide a method for removing the ink from papers printed with inks of the class described by agglomerating the ink into particles sufficient to be removed from the pulp slurry.

Further, it is an object of the present invention to provide a method for reducing the dirt count of papers prepared from recycled papers printed with inks of the class described.

Consideration of the specification, including the examples and Figures to follow, will enable one skilled in the art to determine additional objects and advantages of the invention.

The present invention provides a method for removing ink from printed waste paper to be recycled. The method comprises the steps of pulping the printed paper with water to produce a paper pulp slurry with a consistency of between about 1% and about 20%, adjusting the pH of the paper pulp slurry to between about 6 and about 13, maintaining the pulp slurry at a temperature of between about 30° C. and about 100° C., adding between about 0.05 wt. % and about 3.0 wt. %, based upon the dry weight of the pulp, of an agglomerating agent to the paper pulp slurry, and pulping the paper pulp slurry for a period of between about 5 minutes and about 90 minutes, such that the ink particles agglomerate. Thereafter, between about 0.2 wt. % and about 2.0 wt. % of talc is added to the paper pulp slurry, such that the ink particles agglomerate further. Thereafter, the agglomerated ink particles are removed from the paper pulp slurry.

In preferred embodiments of the invention, about 1.0 wt. % of the talc is added to the paper pulp slurry. Further, prior to adding the talc to the paper pulp slurry, the slurry may be diluted with water.

In additional embodiments, the temperature of the paper pulp slurry is preferably maintained at between about 50° C. and about 100° C., and more preferably between about 50° C. and about 75° C. In an additional preferred embodiment of the invention the paper pulp slurry is maintained at a pH of between about 7 and about 10. In a further preferred embodiment, the slurry is pulped for a period of time of between about 30 minutes and about 60 minutes.

The agglomerated ink particles are removed from the paper pulp slurry by using screening such that the agglomerated ink particles are rejected by the screen using a cyclone cleaner to remove the agglomerated ink particles, or by removing the agglomerated ink particles with a magnetic force.

Figure 2:
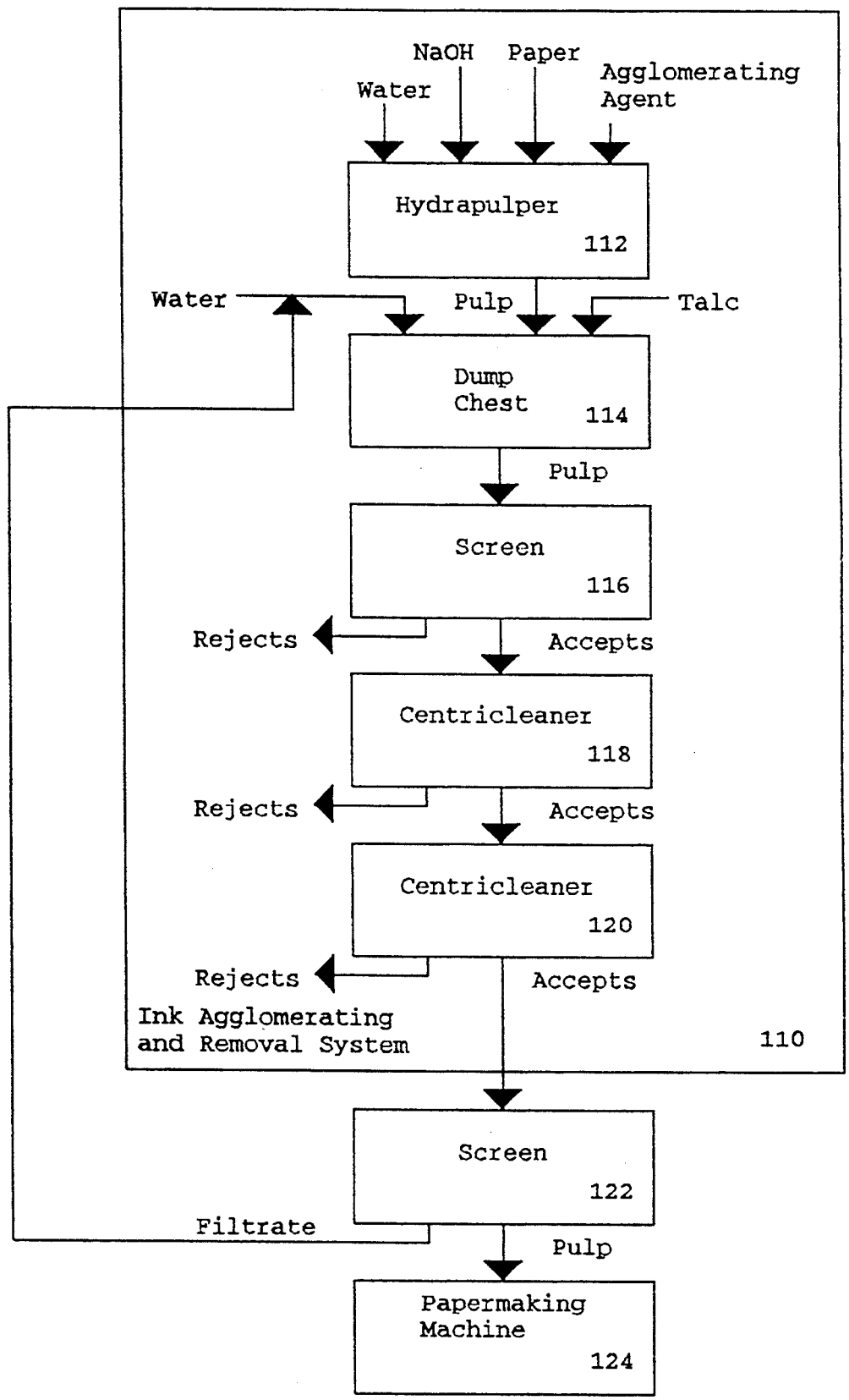

Reference to the following description of exemplary embodiments may help to better explain the invention. Consider the description in conjunction with the drawings in which:

FIG. 1 shows a schematic drawing of an embodiment of a system for removing ink from waste paper by agglomerating the ink particles according to the present invention; and FIG. 2 shows a schematic drawing of an alternate embodiment of a system for removing ink from waste paper by agglomerating the ink particles according to the present invention.

Referring now to the drawings, in which like reference characters designate like or corresponding parts throughout the several views, FIG. 1 shows an ink agglomerating and removal system 10 embodying the present invention. In the practice of the invention, water, pH adjusted using sodium hydroxide (NaOH), and printed waste paper for recycling are introduced into a high speed hydrapulper 12. The hydrapulper is brought to a temperature between about 30° C. to about 100° C. with a pH of between about 6 and about 13. An agglomerating agent is then added to the paper pulp slurry. The paper pulp slurry is pulped in the hydrapulper 12 for a period of between about 5 minutes and about 90 minutes. For most uses, pulping of approximately 30 to 60 minutes is sufficient for the purposes of the present invention. At that time, talc is added to the hydrapulper 12 and pulping is continued for an additional 1 to 60 minutes.

The addition of the agglomerating agent to the hydrapulper 12 increases the size of the ink particles over the size of particles generated without the use of an agglomerating agent. The further addition of talc, after treating the pulp slurry with the agglomerating agent, increases the efficiency of the removal of the agglomerated ink particles. Without being bound by any particular theory, it is believed that the talc particles coat the hot, softened particles of agglomerated ink.

Talc is a unique additive for agglomeration deinking. It has a plate-like surface which is organophilic but also has hydrophilic edges. The hydrophilic property allows complete dispersion in water, while the organophilic surface attracts the ink particles. Talc also has a high specific gravity of 2.8 and is, therefore, very effective at densifying the ink particles.

Further, talc has a very fine particle size (typically a median particle diameter of 3 microns) and a large surface area which gives talc a high probability of attaching the ink particles without the need for intense mixing to improve contact. In addition, talc can absorb colloidal particles onto its organophilic surface. It has the unique ability to interact with all sizes of ink particles from colloidal to large agglomerates. Also, the coating of ink particles with talc increases the hardness of the agglomerate. Therefore, such agglomerates should be stronger and less likely to break down during processing through pumps, etc.

In its use, according to the present invention, the talc is not being used in its traditional role as a detackifier. In fact, talc is normally used in the art to stop agglomeration of contaminants in recycle systems. Thus, the use of talc in the present invention is opposite the use that would be expected.

After the paper pulp slurry has completed its seasoning with the agglomerating agent and the talc, the pulp is then pumped through a fine screen 14 such as is commonly used in the art such as a Bird Centrisorter. The agglomerated ink particles are rejected by the screen 14 while the pulp fibers are passed by the screen as accepts and pumped then to one or more centricleaners 16, 18, such as Bauer Model 606 Centrifugal Cleaners. The final accepts from the centricleaners 16, 18 are then passed out of the ink agglomerating and removal system 10 and to a papermaking machine 20. Thus, the ink from the recycled paper has been effectively removed as agglomerated ink particles and the fibers are available for papermaking.

FIG. 2 shows a schematic diagram of an alternative ink agglomerating and removal system 110. Water, adjusted to a pH of between about 6 and about 13 with NaOH, and printed waste paper for recycling are placed into a hydrapulper 112 at a temperature of between about 30° C. and about 100° C. An agglomerating agent is added to the hydrapulper and the paper is pulped for a period of time of between about 5 minutes and about 90 minutes. As in the system described in FIG. 1, a preferred period of time for hydrapulping is between about 30 minutes and about 60 minutes. Upon completion of the pulping period the pulp is pumped from the hydrapulper 112 into a dump chest 114, where the pulp is diluted with water and talc is added. The pulp remains in the dump chest 114 for a period of about 1 to about 120 minutes (for multiple batches) at which time it is pumped through a screen 116, typically having a slot width of 0.010". The accepts are then passed to one or more centricleaners 118, 120. The accepts from the centricleaners 118, 120 are then pumped to a thickener 122 with the filtrate, containing talc not attached to ink particles, returning to the dump chest 114. The pulp from the thickener 122 is then sent to a papermaking machine 124 for the production of paper.

Thus, the addition of talc to a paper pulp slurry which has been treated with an agglomerating agent at elevated temperatures, i.e., temperatures between about 30° C. and about 100° C., for a period of time of between about 5 minutes and about 90 minutes will produce recycled paper fibers substantially more ink-free than without the addition of the talc.

In order to provide a further understanding of the invention, the following Examples primarily illustrate certain more specific details thereof.

EXAMPLE I

Ink Removal Without the Addition of Talc

Waste paper was added to a two foot diameter hydrapulper with water to produce a 5.5% pulp consistency. The paper pulp slurry was adjusted to a pH of 10 with sodium hydroxide (NaOH) and the temperature of the slurry was maintained at 158° F. (70' C.). A 1.0% dosage of the agglomerating agent comprising a mixture of surfactants was added and the slurry was pulped for a period of 30 minutes. The pulp was then diluted and screened using a 0.010" flat screen. The screened pulp was then cleaned using a 3" diameter centrifugal cleaner using a pressure drop of 30 psi and a feed consistency of 0.8%, a temperature of 35° C. and a reject rate of approximately 30%. The speck count (number of specks/$m^2$) of the pulp prior to the addition of the agglomeration agent was 8,451. The speck count after the final centrifugal cleaner was 1,970 for a reduction of 77%.

EXAMPLE II

Ink Removal With the Addition of Talc

In a manner similar to Example I, waste paper was added to a two foot diameter hydrapulper with water to produce a 5.5% pulp consistency. The paper pulp slurry was adjusted to a pH of 10 with sodium hydroxide (NaOH) and the temperature of the slurry was maintained at 158° F. (70° C.). A 0.8% dosage of the agglomerating agent as used in Example I was added and the slurry was pulped for a period of 30 minutes. A dosage of 1.0% of talc was added and the slurry was mixed for an additional 10 minutes. The pulp was then diluted and screened using a 0.010" flat screen. The screened pulp was then cleaned using a 3" diameter centrifugal cleaner using a pressure drop of 30 psi and a feed consistency of 0.8%, a temperature of 35° C. and a reject rate of approximately 30%. The speck count (number of specks/$m^2$) of the pulp prior to the addition of the agglomeration agent was 17,770. The speck count after the final centrifugal cleaner was 2,134 for a reduction of 88%. Thus, the addition of talc to the hydrapulper after allowing the slurry to react with the agglomerating agent resulted in an 11% improvement in the efficiency of speck removal, despite using a lower dosage of agglomerating agent.

EXAMPLE III

Post-consumer white waste paper containing laser printing was repulped in an fourteen foot diameter hydrapulper equipped with a 200 HP motor. The operating temperature was 70° C., and the pH was 10, adjusted with NaOH. A dosage of 0.8% of the agglomeration agent as used in Example I was added to the pulper. After a 45 minute batch time, 1.0% of talc was added to the slurry. The pulp was diluted and processed through a Bird Model 100 Centrisorter pressure screen equipped with a slotted screen cylinder having 0.008" slot width. The screen removed debris and agglomerated ink particles. The pulp was then processed through Hymac 8-inch diameter centrifugal cleaners for removal of additional agglomerated ink. The speck counts of the pulp at the various stages of the process are shown in Table I. The deinked pulp was then used at a 20% level to make coated publication paper. Paper machine and coating operation was normal and the paper met the standard specifications, including dirt and brightness.

TABLE I

| Location | Speck Count (number of specks/sq.m) Feed | Output | % Speck Reduction |
| --- | --- | --- | --- |
| Pulper | 20,204[a] | 11,901 | 41.0 |
| Screen | 14,687 | 11,812 | 9.6 |
| First Cleaner | 11,812 | 4,041 | 65.8 |
| Second Cleaner | 4,041 | 1,943 | 52.0 |

[a]prior to addition of agglomeration agent

EXAMPLE IV

In a manner similar to Example III, post-consumer white waste paper containing laser printing was repulped in an eighteen foot diameter hydrapulper. The operating temperature was 70° C. and the pH was 10. A dosage of 0.8% of agglomeration agent was added to the pulper. In the dump chest, 1.0% of talc was added to the slurry. The pulp was diluted and processed through a Bird Model 100 Centrisorter pressure screen equipped with a slotted screen cylinder having 0.008" slot width. The pulp was then processed through Bauer Model 606 centrifugal cleaners for removal of additional agglomerated ink. The speck counts of the pulp at the various stages of the process are shown in Table II. The deinked pulp was then used at a 15% level to make copier paper. The paper brightness, sizing and runnability were all within normal specifications.

TABLE II

| Location | Speck Count (number of specks/sq.m) | % Speck Reduction |
| --- | --- | --- |
| Pulper[a] | 9,945 | — |
| Screen | — | — |
| First Cleaner | 294 | 97 |
| Second Cleaner | 0 | 100 |

[a]after addition of the agglomeration agent

Therefore, the present invention provides a method of removing the ink from waste paper by agglomeration of the ink particles. The method of the present invention provides a superior method to those methods currently used in the art.

Although this specification discloses particular embodiments of the invention, these Examples merely describe illustrations of the invention. Those skilled in the art may suggest numerous rearrangements or modifications without departing from the spirit of the invention. In particular, the temperature of the pulping and the consistency of the pulp may be varied within the range as set forth in the specification without substantially decreasing the effectiveness of the addition of the talc to the paper pulp slurry.

The appended claims set forth various novel and useful features of the invention.

We claim:

1. A method for removing ink from printed paper to be recycled, the method consisting essentially of the sequential steps of:
    pulping the printed paper to be recycled with water to produce a paper pulp slurry with a consistency of between about 1% and about 20%;
    adjusting the pH of the paper pulp slurry to between about 6 and about 13;
    maintaining the paper pulp slurry at a temperature of between about 30° C. and about 100° C.;
    adding between about 0.05 wt. % and about 3.0 wt. %, based on the dry weight of the pulp, of an agglomerating agent to the paper pulp slurry;
    pulping the paper pulp slurry for a period of time of between about 5 min. and about 90 min., such that the ink particles agglomerate;
    thereafter, adding between about 0.2 wt. % and about 2.0 wt. %, based on the dry weight of the pulp, of talc to the paper pulp slurry; and
    thereafter, removing the agglomerated ink particles from the paper pulp slurry.

2. The method of claim 1 wherein about 1.0 wt. %, based on the dry weight of the pulp, of talc is added to the paper pulp slurry.

3. The method of claim 1 wherein, prior to adding the talc to the paper slurry, the paper slurry is diluted with water.

4. The method of claim 1 wherein the temperature of the paper pulp slurry is maintained at a temperature of between about 50° C. and about 100° C.

5. The method of claim 4 wherein the temperature of the paper pulp slurry is maintained at a temperature of between about 50° C. and about 75° C.

6. The method of claim 1 wherein the pH of the paper pulp slurry is maintained at between about 7 and about 10.

7. The method of claim 1 wherein the paper pulp slurry is pulped, in the second pulping step, for a period of time of between about 30 min. and about 60 min.

8. The method of claim 1 wherein the step of removing the agglomerated ink particles from the paper pulp slurry is carried out by screening the slurry such that the agglomerated ink particles are rejected by the screen.

9. The method of claim 1 wherein the step of removing the agglomerated ink particles from the paper pulp slurry is carried out by removing the agglomerated ink particles with a cyclone cleaner.

10. The method of claim 1 wherein the step of removing the agglomerated ink particles from the paper pulp slurry is carried out by removing the agglomerated ink particles with a magnetic force.

* * * * *

UNITED STATES PATENT AND TRADEMARK OFFICE
CERTIFICATE OF CORRECTION

PATENT NO. : 5,340,439
DATED : August 23, 1994
INVENTOR(S) : Larry D. Markham and Narendta R. Srivatsa It is certified that error appears in the above-indentified patent and that said Letters Patent is hereby corrected as shown below:

Column 4, line 28, after 70, delete " ' " and isnert -- ° --.

Signed and Sealed this

First Day of November, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,340,439
DATED : August 23, 1994
INVENTOR(S) : Larry D. Markham and Narendra R. Srivatsa It is certified that error appears in the above-indentified patent and that said Letters Patent is hereby corrected as shown below:

On the title page: Item

[75], Inventors: delete "Narendta R. Srivatsa" and insert therefor -- Narendra R. Srivatsa --.

Signed and Sealed this

Twenty-ninth Day of November, 1994

Attest:

BRUCE LEHMAN

Attesting Officer  Commissioner of Patents and Trademarks